(No Model.) 2 Sheets—Sheet 1.
H. G. STIEBEL & W. S. KISINGER.
STREET SPRINKLER.
No. 442,834. Patented Dec. 16, 1890.
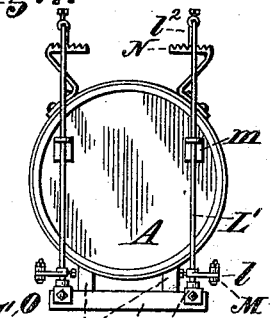
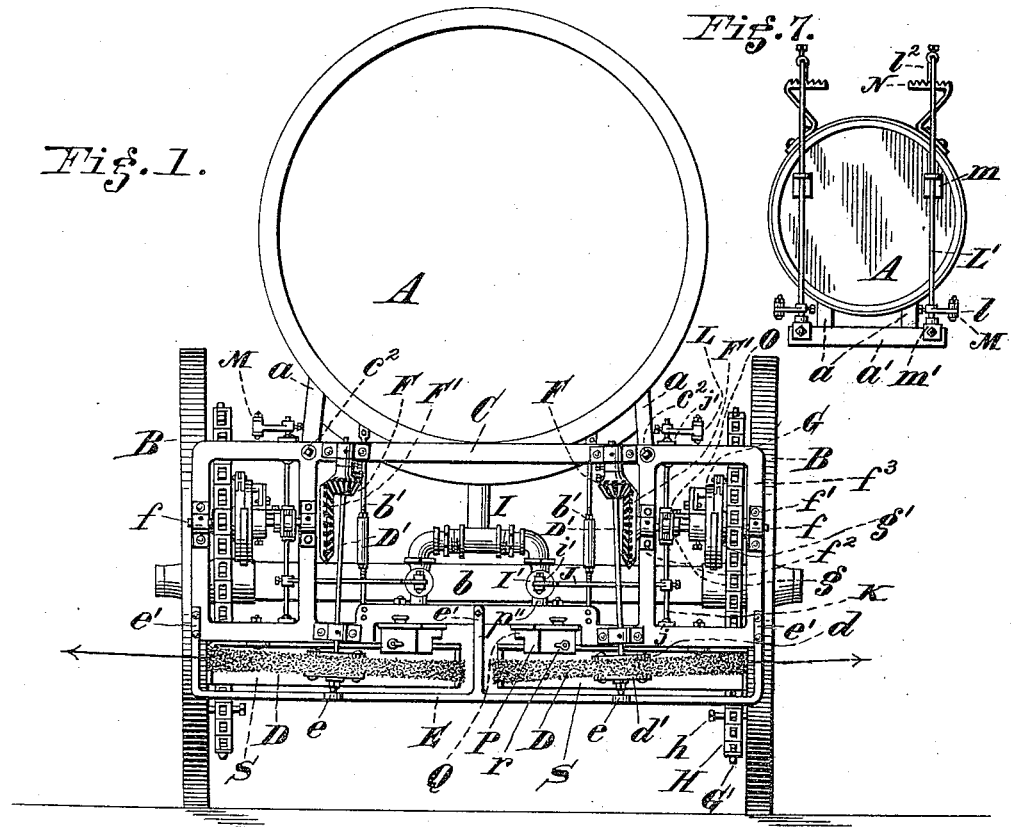
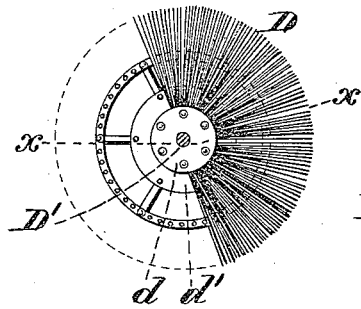
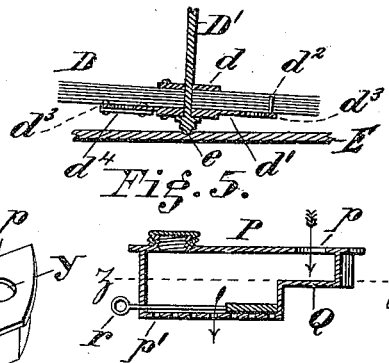
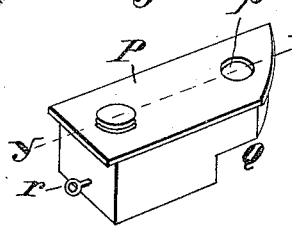
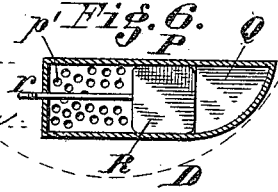
Attest
Arthur J. Smith
B. Donaldson
Inventors
Henry G. Stiebel and
William S. Kisinger,
by [signature]
their Attorney.
THE NORRIS PETERS CO., PHOTO-LITHO., WASHINGTON, D. C.

(No Model.) 2 Sheets—Sheet 2.
H. G. STIEBEL & W. S. KISINGER.
STREET SPRINKLER.
No. 442,834. Patented Dec. 16, 1890.
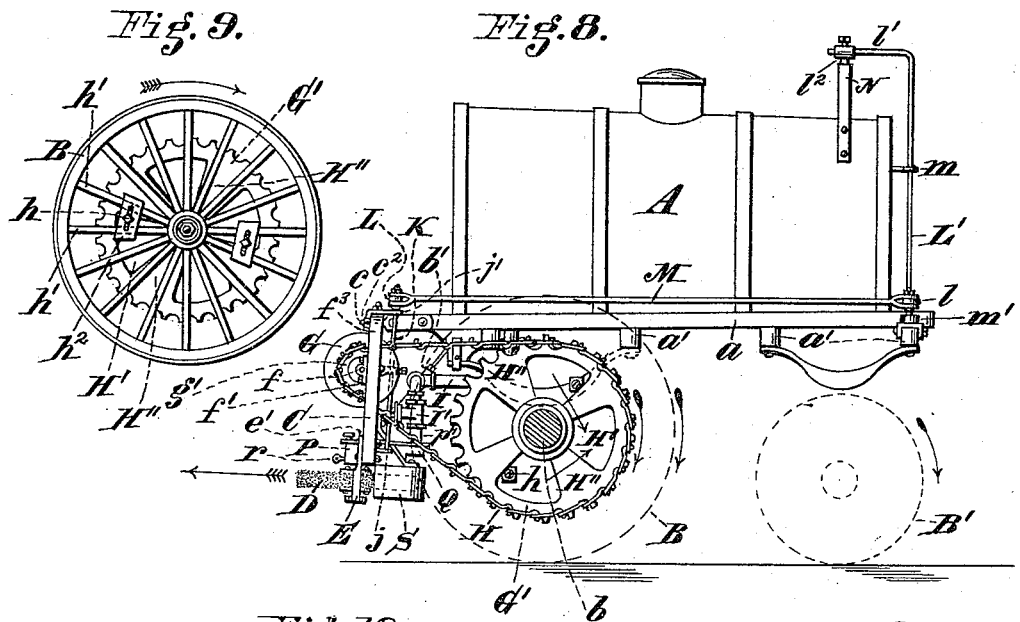
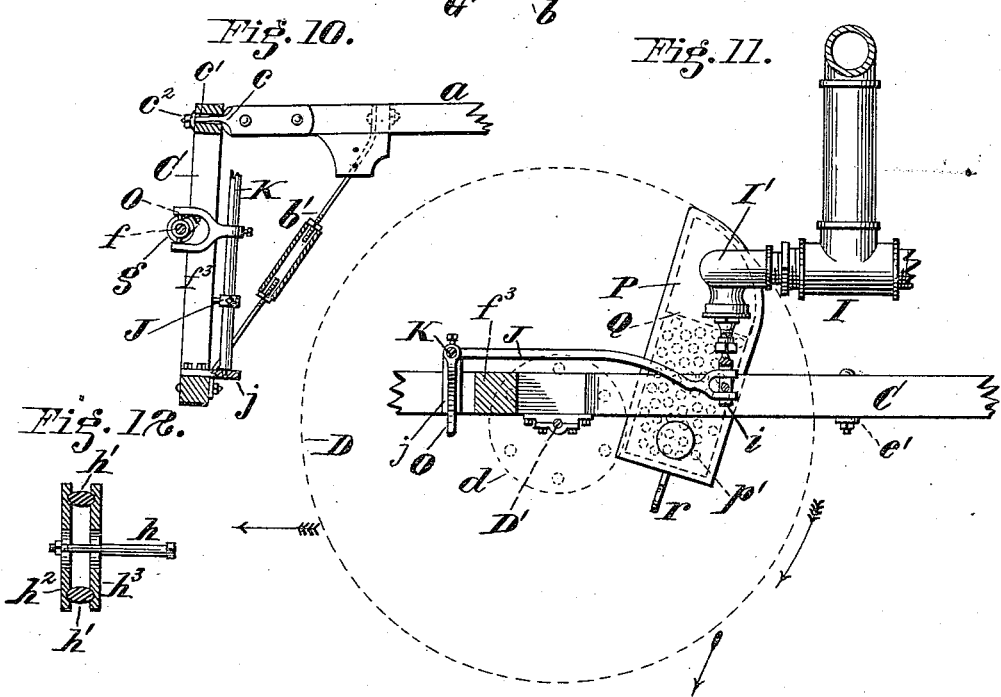

UNITED STATES PATENT OFFICE.

HENRY G. STIEBEL, OF CINCINNATI, OHIO, AND WILLIAM S. KISINGER, OF BELLEVUE, KENTUCKY, ASSIGNORS TO SAID STIEBEL.

STREET-SPRINKLER.

SPECIFICATION forming part of Letters Patent No. 442,834, dated December 16, 1890.

Application filed December 6, 1888. Serial No. 292,821. (No model.)

*To all whom it may concern:*

Be it known that we, HENRY G. STIEBEL and WILLIAM S. KISINGER, citizens of the United States, residing, respectively, at Cincinnati, in the county of Hamilton and State of Ohio, and at Bellevue, in the county of Campbell and State of Kentucky, have invented certain new and useful Improvements in Street-Sprinklers, of which the following is a specification.

Our invention relates to a sprinkling cart or wagon in which rotary brushes are used to receive and distribute the water from the tank in spray over the street; and it consists in the mechanism hereinafter fully described, and particularly pointed out in the claims.

In the accompanying drawings, Figure 1 is a rear elevation of a sprinkling cart or wagon, showing our improvements applied thereto in their normal position or at rest; Fig. 2, a plan of one of our rotary water-distributers with part of the bristles removed to show the skeleton or frame of the brush, its shaft being in cross-section; Fig. 3, a transverse section of one of the rotary distributers on line $x\ x$, Fig. 2, including a broken longitudinal section of the rod or bar upon which both the rotary distributers are pivoted; Fig. 4, a detail perspective view of one of the supplemental water-boxes, which receive the water on its way from the tank to the distributers and permit it to expand or spend its force therein before finally discharging into the said distributers; Fig. 5, a longitudinal sectional elevation of the box shown in Fig. 4, taken on the line $y\ y$ thereof, its discharge-regulator or cut-off-valve plate being adjusted for the sprinkling of a wide street; Fig. 6, a sectional plan of the box shown in Figs. 4 and 5, taken on the line $z\ z$ of Fig. 5; Fig. 7, a front elevation of the water-tank, showing the rod mechanism for opening and closing the controlling-valves and starting and stopping the rotary brushes or distributers; Fig. 8, a longitudinal elevation of our improved sprinkling-wagon, showing its wheels in dotted lines, the rear axle in section, and the bulk of the running-gear omitted, which latter is not herein claimed; Fig. 9, an outside or front elevation of one of the hind wheels of the wagon, showing the manner in which the sprinkler-driving sprocket-wheel is placed on the axle adjacent thereto and the devices for coupling said hind wheel with said sprocket-wheel so that they shall revolve together; Fig. 10, a detail sectional elevation, partly broken, showing the manner in which the sprinkler-frame is connected with the main frame of the wagon, so that the former can be set at the desired angle, a part of the rod and clutch mechanism being also shown therein; Fig. 11, a plan view, partly broken and in section, showing one side of the lower part of the sprinkling devices, the valve and clutch controlling mechanism, together with one of the supplemental water-boxes and a distributer-brush, (in dotted lines,) being clearly illustrated therein; and Fig. 12, a transverse section of two adjoining spokes of one of the hind wheels of the wagon, showing the manner in which the stop-arm for engaging the adjacent sprocket-wheel is applied thereto.

A represents the water-tank mounted upon the longitudinal bars $a\ a$, which in turn are supported by the transverse bars or bolsters $a'$. The bolsters are connected with the running-gear of the vehicle in the usual or any desirable manner.

B represents the hind wheels of the wagon mounted upon the axle $b$, and B' represents the customary fore wheels. (Shown in dotted lines in Fig. 8.)

C represents a transverse skeleton frame forming the sprinkler-frame and connected at its upper portion with the rear ends of the longitudinal bars $a\ a$, as clearly shown in Figs. 8 and 10. We prefer to set the sprinkler-frame C at an angle of ninety-two and one-half ($92\frac{1}{2}$) degrees, or thereabout, the purpose of which will be presently described, and in order to do this conveniently we provide arms $c\ c$ upon the rear ends of bars $a\ a$, which arms project through enlarged openings or slots $c'$ in the upper bar of the said frame and are screw-threaded on their outer ends to receive the fastening-nuts $c^2$ for pivotally connecting the frame with the said bars, and we secure the said frame at the desired angle or adjust it thereto by means of the expansible rods $b'$.

D D represent two rotary brushes forming the water distributers or sprinklers, and mounted upon the shafts D', which pass upward from their centers and journal in boxes on the frame C. The lower ends of the shafts D' project beyond the bottom of the brushes D, and are each rounded off to form a bearing with a socket or step $e$ in a transverse bar E, which latter is suspended by upright arms or extensions $e'$ from the lower position of the sprinkler-frame.

The water-distributers D are preferably circular ones and composed of bristles of boss or the like of medium stiffness, bound together at their inner ends, or the center of the brush, by disks or plates $d$ and a hub or plate $d'$, as shown in Figs. 2 and 3. As it is designed that the brushes should revolve at a high speed—say of five hundred (500) revolutions per minute—we have provided a series of upright pins $d^2$ at suitable intervals apart on a ring $d^4$ with the hub or plate $d'$ of the brush-frame. These pins $d^2$ project upward between the bristles or meshes of the brush and thereby prevent their dragging or trailing in the revolutions of the distributer, which they might otherwise do, as is obvious, and thereby materially affect the operation of said distributer. It will be seen by reference to Fig. 1 that the shafts D' of the distributer-brushes D are journaled at an angle of ninety-two and one-half ($92\frac{1}{2}$) degrees, thereby arranging said brushes at an inclination downward toward the center of the device, the purpose of which will be hereinafter described in connection with the before-stated angle at which the sprinkler-frame itself is arranged.

F represents a pinion on each of the brush-shafts D' meshing with a gear-wheel F' on the inner end of each one of the short horizontal shafts $ff$, which are journaled in boxes $f'$ $f^2$ on the vertical bars $f^3$ of the sprinkler-frame.

As the hind wheels of heavy wagons are usually arranged on their axles so that they lean outwardly at a slight angle at their upper portions, we have arranged the journal bearings or boxes $f'$ $f^2$ on the sprinkler-frame at or about the same angle as that at which the wheels lean, thereby causing their several shafts $ff$ and the parts mounted thereon to lie in the same plane, the purpose of which we will also describe hereinafter.

G represents a clutch device, preferably a frictional one, of any suitable construction and mounted loose on the shafts $ff$.

$g$ is the usual shifting-clutch collar feathered on both the shafts $ff$ and adapted to engage the adjacent clutch devices G when it is desired to operate the machine.

$g'$ $g'$ are small sprocket-wheels formed on the outer faces of the principal wheels of both the clutch devices, as clearly shown in Fig. 8, and G' is a large driving sprocket-wheel loosely mounted on the hind axle $b$, adjacent to the inner faces of both the hind wheels of the wagon or on the inner ends of the hubs of said hind wheels in line with said small sprockets $g'$.

H H represent ordinary drive-chains running over and connecting both sets of sprockets G' $g'$.

$hh$ represent horizontal stop-arms, attached to spokes $h'$ of the hind wheels by means of slotted plates $h^2$ $h^3$ and projecting inwardly through the openings H' in the driving-sprockets G' to engage the spokes H'' of said driving-sprockets, and thereby form an operating coupling with said hind wheels. The inner faces of the plates $h^2$ $h^3$ are grooved transversely to accommodate the rounded edges of spokes $h'$, thereby providing a firm seating of the plates in position. The arms $h$, projecting from said plates $h^2$ $h^3$, are shouldered about mid-length to bear against one face of plate $h^3$, and are provided on their outer threaded ends with fastening-nuts.

I represents the water-discharge pipe and branches leading from the rear end of the bottom of tank A to the controlling-valves I' I', all of which are of any suitable construction, the valves being in this instance ordinary sluice or gate ones.

$i$ $i$ represent forked outer ends of the valve-stems, pivotally connected with the forked ends of long horizontal levers or rods J, which latter are keyed or otherwise firmly mounted at their outer ends upon vertical shafts K. The jaws or forks at the inner ends of levers J, which engage the valve-rods, are wider-mouthed than the diameters of the bolts pivotally connecting the parts, as clearly shown in Fig. 11, the purpose of which we will also fully describe hereinafter.

$j\,j'$ represent bearing-plates on the sprinkler-frame for the shafts K, and L L are crank-arms on the upper ends of said shafts, arranged in approximately the same vertical plane as the long levers J.

M M are longitudinal rods whose forked rear ends are pivotally connected with crank-arms L L, and whose forked fore ends are similarly connected with crank-arms $l$ $l$ on the lower ends of the vertical shafts L', at the fore end of the tank A.

$m$ $m'$ represent upper and lower bearings, respectively, of the shafts L', and $l'$ are rearwardly-disposed arms or handles on the upper ends of shafts L', convenient to the driver for operating the machine.

$l^2$ represents a dog or catch on each of the arms or handles I', whose depending teeth or points engage the teeth of the racks N on the upper fore position of the water-tank to hold the handles in the desired position, with the devices either operating or at rest.

O O represent forked arms or jaws on the vertical shafts K, having short vertical pins, as customary, to engage the grooves in the clutch-collars $g$, as distinctly shown in Fig. 10. The arms or jaws O are securely mounted on the shafts K a short distance above the long levers J, and at or about right angles thereto, as shown in Fig. 11, the former (said clutch-arms O) being made considerably shorter than the latter, (said levers J,) so that the distributer-brushes and the water-controlling valves are operated one slightly in advance of the other, as hereinafter stated in the description of the operation of the machine.

P P represent horizontal supplemental water-boxes attached in any suitable manner to the lower bar of the sprinkler-frame immediately above the several distributer-brushes.

$p$ is an inlet-opening at one end of both boxes P, and $p'$ are perforations in the bottom of the boxes, through which the water discharges into the brushes. The branches $p''$ of the water-pipe connections with the tank couple the lower mouths of the valve-shells with the inlet-openings $p$.

Q represents a shelf or offset at the inlet end of the water-boxes P, immediately below said inlets $p$, forming a breakwater, which is adapted to check the force of the water before reaching the outlet perforations and discharging into the brushes, thereby cushioning or permitting the proper expansion of the column of water before it reaches said brushes.

R represents a plate in each of the water-boxes P, adapted to cover a portion of the discharge-openings in their bottoms, and $r$ is a handled rod or stem on the valve-plate R, whereby the same may be adjusted from the outside when it is desired to sprinkle either a wide or a narrow street, the valve-plate being shown its full stroke inward in Figs. 5 and 6, the position it assumes when a wide street is to be watered, and the reverse when a street of less breadth, or a narrow one, is to be watered.

The operation of our device is as follows: The handles $l'$ of the rod and crank mechanism for starting and stopping the sprinkler devices being turned outwardly the desired distance the clutch mechanism is thrown into working position. The clutch arms or jaws O being shorter than the valve-levers J and the clutch device being a frictional one, the brush mechanism begins moving as soon as the clutch-collars $g$ start to move, the brushes thereby attaining quite a momentum before the valve-gates start to open and release the water from the tank. The valve-gates do not commence moving until the rear walls of the wide jaws at the inner ends of the long levers J come into contact with the bolts connecting the said levers with the valve-stems, thereby properly timing the movement of the said valves in connection with the movement of said brush mechanism and causing the brushes to properly act upon the water as soon as it issues from the boxes P.

We have found in practice that the ascending angle—laterally and rearwardly—at which we arrange our distributer-brushes and their supporting-frame, as hereinbefore described, is the correct one, as it enables the water to be sprayed at an elevation and spread the desired distance over a street. Our ordinary brush-distributers are herein described and illustrated in their preferred form, the water being thrown from them in light spray over the street, thus performing the work both uniformly and economically and at the same time completely obviating the damaging and objectionable pooling or flooding of the water on the pavement, as has been the case in the use of the perforated-chamber distributers and other kindred devices heretofore where the water was delivered in streams. To stop the sprinkling devices at any desired point at crossings or elsewhere the handles $l'$ are drawn inwardly, thereby closing the valves I' and disengaging the collars $g$ from the clutch devices. In the stopping of the brush and valve devices the latter are closed slightly in advance of the former, and the operation is performed thus: The wide-mouthed inner ends of the valve-rods J in moving backward strike with their fore walls the bolts connecting the said rods with the valve-stems, thereby starting said valve-stems and the gates at their inner ends to travel inward. While this motion is taking place and also the final customary wedging of the valve-gates the clutch arms or jaws O are drawing or shifting the collars $g$ from engagement with the clutch devices G, the latter motion being more tardy than that of closing the valve because the frictional clutch does not cease to rotate until the clutch-collar has reached the full end of its stroke, the momentum of the brushes also assisting in preserving or prolonging their operation slightly longer than the discharge of the water through the valves, thereby preventing any waste of water or the spraying of it on a place not intended or desired.

The large driving-sprockets G are preferably loosely mounted on the inner ends of the hind-wheel hubs, and operate conjointly therewith, when the stop-arms $h\ h$ come into contact with the spokes H'' of said sprockets. The space between the spokes of said sprocket-wheels permits the stop-arms $h$ to have a slight advance movement therein, when the wagon starts to move forward, thereby lessening the strain incident to the starting. Should the said stops $h$ be in contact with said spokes, in driving engagement before starting, the wagon should be backed sufficient to bring the stops back to the rear end of said space between the spokes, and then proceed as before.

We have arranged the journal-bearings $f'$ $f^2$ on the sprinkler-frame and their accompanying shafts $f$ and clutch devices at the same angle of deflection as that at which the hind wheels lean, so that the former parts will properly align with the latter (said hind wheels) in their revolutions, thereby obviating any locking of the mechanism which might otherwise occur.

It will be seen by reference to Figs. 6 and 11 that the perforations $p'$ in the bottom of the supplemental water-boxes P are arranged in arcs or rows of curved lines, the same be ing concentric with the periphery of the circular distributers. This arrangement causes the water to discharge into the brushes in the line or direction of their movement, and thereby materially facilitates and enhances the operation of the device.

It is obvious that both the brush-distributers can be used simultaneously, or at one time, for a wide or narrow street, as the case may be, or as occasion may require. The arrows in Figs. 1 and 8 indicate the direction in which the water is sprayed from the brushes and the direction of working movement of the several parts, and those in Fig. 11 indicate the direction of movement of the brush and the points at which the water starts and ceases to leave the brush in spraying.

The fenders or guards S, which are attached in any suitable manner to the lower bar of the sprinkler-frame, cover the inner portions of the brushes, as shown in Figs. 1 and 8, and prevent the falling on the brushes of dust or other foreign matter, caused by the movements of the horses and wheels, thereby keeping said brushes clean and clear at all times for operation, where otherwise they and their bearings might become clogged and rendered entirely unfit for use. Suitable openings are provided in the fenders S directly beneath the discharge-openings of the water-boxes P to permit the unobstructed passage of the water to the brushes.

A rotary brush-sprinkler constructed as herein shown and described will enable the spraying or watering of a street its full width, the wagon continuing onward or straight ahead, and thus at least forty per cent. (40%) more surface is watered than can be accomplished by the devices hitherto in use.

Instead of using the handles $l'$ on the shafts $L'$ to start and stop the sprinkling devices by hand a suitable similar connection with a pair of treadles and springs could be used, that are mounted convenient to the feet of the driver, which would not then interfere with his management of the horses.

We are aware that it is old to provide a sprinkler of this description with a clutch for governing the rotation of the water-wheel, a valve controlling the water-supply, and mechanism whereby the movement of the clutch shuts off the water-supply, as such is embraced in an application of Meyer & Stiebel, filed June 22, 1887, Serial No. 242,174.

We claim as our invention, and desire to secure by Letters Patent of the United States—

1. In a street-sprinkler, the combination, with the frame C and the rotary sprinkler-brushes D mounted therein, of a hinge-joint formed by the rearwardly-projecting bolts or arms $c\ c$, nuts $c^2$, and the slots $c'$, said frame being adjustably connected with the rear end of the sprinkling cart or wagon by the expansible rods or braces $b'$, whereby its lower end may be arranged at the desired angle rearwardly, substantially as herein set forth.

2. In a street-sprinkler, the combination, with the frame C, of the rotary brushes D, composed of radial bristles, disks, or plates $d$ and a skeleton frame $d'$, said bristles being held at their inner ends between the parts $d$ and $d'$, and said skeleton frame having a ring $d^3$, studded with upright pins or teeth $d^4$, which latter project upward between said bristles and bind or retard them against trailing in the revolutions of the brushes, substantially as and for the purpose specified.

3. In a street-sprinkler, the supplemental water-boxes P, having inlets $p$, connecting with the water-tank in any suitable manner, perforations or discharge-openings $p'$, and breakwater-shelves Q, in combination with the frame C and rotary sprinkler-brushes D, substantially as and for the purpose specified.

4. In a street-sprinkler, the combination, with the rotary sprinkler-brush D and a supplemental water-box P, having an inlet-opening $p$, discharge perforations or outlets $p'$, and a breakwater-shelf Q, of a handled valve R, whereby a portion of said discharge-perforations in the bottom of the box are covered and the point of water-supply to the brush adjusted to accommodate different widths of streets, substantially as herein set forth.

5. In a street-sprinkler, the combination, with the chain-driving and friction-clutch mechanisms G G' $g$ $g'$ H and the valve mechanism T' $i$, of the forked arms O, closely engaging the clutch mechanism, the forked levers or rods T, loosely engaging the valve mechanism, and the vertical shafts K for operating the said arms and levers, in the manner substantially as specified.

6. In a street-sprinkler, a starting and stopping mechanism for the sprinkler devices, composed, substantially, of the vertical handled shafts L' $l'$, crank-arms $l$, longitudinal rods M, crank-arms L, and the vertical shafts K, connecting by means of the short forked arms or jaws O and the long levers J with the brush and valve devices, respectively, as herein set forth.

7. In a street-sprinkler, the combination, with the spidered driving-wheels G' H' H", of couplings composed of stop-arms $h$, plates $h^2$ $h^3$, and fastening-nuts, whereby the said driving sprocket-wheels are operatively connected with the hind wheels of the wagon, substantially as herein set forth.

In testimony whereof we have hereunto set our hands in the presence of two subscribing witnesses.

HENRY G. STIEBEL.
WILLIAM S. KISINGER.

Witnesses:
L. M. HOSEA,
L. E. HOSEA.